US009838878B2

(12) United States Patent
Sauder et al.

(10) Patent No.: US 9,838,878 B2
(45) Date of Patent: Dec. 5, 2017

(54) DETECTING UNDESIRABLE SIGNALLING TRAFFIC

(71) Applicant: VODAFONE IP LICENSING LIMITED, Newbury, Berkshire (GB)

(72) Inventors: Oliver Sauder, London (GB); Simon Sporton, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 14/879,797

(22) Filed: Oct. 9, 2015

(65) Prior Publication Data

US 2016/0105802 A1    Apr. 14, 2016

(30) Foreign Application Priority Data

Oct. 13, 2014    (GB) .................................. 1418100.2

(51) Int. Cl.

| H04M 1/66 | (2006.01) |
|---|---|
| H04W 12/12 | (2009.01) |
| H04W 48/02 | (2009.01) |
| H04L 29/06 | (2006.01) |
| H04Q 3/00 | (2006.01) |
| H04M 7/06 | (2006.01) |

(52) U.S. Cl.
CPC ......... *H04W 12/12* (2013.01); *H04L 63/1408* (2013.01); *H04Q 3/0025* (2013.01); *H04W 48/02* (2013.01); *H04L 63/0263* (2013.01); *H04L 63/1466* (2013.01); *H04M 7/06* (2013.01)

(58) Field of Classification Search
None
See application file for complete search history.

(56) References Cited

U.S. PATENT DOCUMENTS

| 7,366,276 | B2 * | 4/2008 | Serroyen ............. H04Q 3/0025 |
|---|---|---|---|
| | | | 370/377 |
| 9,027,127 | B1 * | 5/2015 | Soldo .................. H04L 63/1425 |
| | | | 705/14.2 |
| 2007/0072587 | A1 | 3/2007 | Della-Torre |
| 2008/0292077 | A1 * | 11/2008 | Vinokurov ............ H04M 3/436 |
| | | | 379/142.04 |
| 2016/0020969 | A1 * | 1/2016 | Vasseur ................. H04L 43/062 |
| | | | 370/252 |

FOREIGN PATENT DOCUMENTS

| GB | 2421142 | 6/2006 |
|---|---|---|
| WO | 9833340 | 7/1998 |

OTHER PUBLICATIONS

European Search Report issued in Application No. 14191834 dated Mar. 17, 2015.
Fair Isaac Corporation "Optional Add-on Features for RoamEx Data Exchanger Newtork", 2005.

* cited by examiner

*Primary Examiner* — Erika Washington
(74) *Attorney, Agent, or Firm* — Workman Nydegger

(57) ABSTRACT

Undesirable signalling traffic received at a telecommunications network is detected by establishing at least one statistical parameter in respect of signalling traffic received at the telecommunications network from at least one specific source and evaluating the established at least one statistical parameter against one or more predetermined statistical profiles.

17 Claims, 3 Drawing Sheets

DETECTING UNDESIRABLE SIGNALLING TRAFFIC

CROSS REFERENCE TO RELATED APPLICATIONS

This application claims benefit and priority to European Application Number EP 14191834.2, filed on Nov. 5, 2014, which claims priority to United Kingdom Patent Application No. GB 1418100.2, filed on Oct. 13, 2014, the entireties of which are incorporated herein by reference.

TECHNICAL FIELD OF THE INVENTION

The present invention concerns a method of detecting undesirable signalling traffic received at a telecommunications network and a corresponding network entity, which may act as a firewall.

BACKGROUND TO THE INVENTION

Signalling System Number 7 (SS7) is used between mobile networks to enable various functions including: supporting voice interconnection; roaming mobility management; and internetwork Short Message Service (SMS). SS7 was developed before the Internet age, where large, normally state-owned organisations, ran telephone networks. Little time was spent protecting the protocols from abuse as it was thought that the barriers to entry were sufficiently high to protect networks. Mobile networks typically use SS7 to pass information about roaming customers, ensuring that such customers can register on networks and receive their calls or text messages.

With the introduction of Internet Protocol (IP) as an alternative transport layer, SS7 is now much more available to those who would want to abuse it. Examples of this abuse that impact customers and the network include:

HLR lookup—for example see http://gateway.txtnation.com/solutions/networklookup/numberqueries/numberlookup?ads=google&ppc=globalhlr;

location tracking—for example see http://www.washingtonpost.com/business/technololy/for-sale-systemsthat-can-secretly-track-where-cellphone-users-go-around-theglobe/2014/08/24/f0700e8a-f003-11e3-bf76-447a5df6411f_story.html;

Anti-Steering of Roaming (A-SoR), which tries to overcome a network operator's ability to direct their roaming customers to a preferred network operator, increasing costs for customers and has been banned by GSMA (see http://pctelecoms.blogspot.co.uk/2010/04/anti-sor-activities-banned-bygsms-barg.html); and badly (or maliciously) designed Machine-to-Machine (M2M) systems—these solutions have sent SS7 traffic into networks, but with no associated financial payment.

One problem with detecting fraudulent use of SS7 based application protocols is that only a small number of abusive signalling messages are needed and these are easily hidden within the mass of legitimate traffic. Referring first to FIG. 1, there is schematically shown how malicious traffic, in this case anti-SoR signalling, may be hidden within roaming signalling. Roaming partner networks (Network A to network F) are shown to be constructed from many diverse network elements. These may be elements that are one or more of: well defined by standards (for instance HLR, SMSC, VLR); legitimate customised nodes; and illegitimate nodes (for example A-SoR).

As the signalling traffic from all roaming partners to a target home network tends to be sent over a common transit network, identifying the true origin of signalling traffic is difficult, leading to the opportunity for a malicious attacker to spoof the identity of a legitimate partner in their signalling traffic either for commercial gain, or to attack the target network.

Malicious traffic can be generated from legitimate networks with a valid roaming agreement. In this case, an A-SoR entity in such a malicious network (Network A) may generate signalling to try to cause a roaming UE in the targeted network to roam on a network preferred by Network A. Moreover, malicious traffic can be generated from nodes within that network that also generate legitimate traffic.

It is not straightforward to identify suspicious network elements so that automatic or manual controls can be put in place to protect networks. This difficulty is equally applicable to all SS7 network operators. Various anti-fraud techniques are already implemented within GSM networks, but these tend to be targeted at specific threats (such as Anti-Steering of Roaming, HLR lookup). For example: http://www.cellusys.com/roaming-solutions/; http://www.cellusys.com/roaming-solutions/anti-steering-detectionprevention/; a product sold by Gemalto N.V., under the Trade Marked name LinqUs Roaming Director. SS7 firewall capabilities are known, but typically these do not provide much more protection than that provided by Access Control Lists (ACLs) based on the lower layer SS7 protocol nodal addresses.

Thus, multiple techniques may be needed to combat different threats, adding to cost and complexity. It is also expected that new threats will arrive and predicting those threats adds a further dimension to the already significant challenges that telecommunications network operators face.

SUMMARY OF THE INVENTION

Against this background, there is provided a method of detecting undesirable signalling traffic received at a telecommunications network (especially a mobile telecommunications network) in line with claim 1 and a corresponding network entity in accordance with claim 14. It may be embodied as a computer program, programmable logic, firmware or other configurable system. Other preferred features are disclosed with reference to the claims and in the description below.

Thus, there is provided an approach to detect undesirable signalling traffic received at a telecommunications network, by evaluating that traffic (particularly a patter or profile of the traffic) against one or more predetermined profiles. This improves on existing techniques as it can do one or both of: identifying the specific threats or undesirable behaviour; and identifying previously unknown (also known as "zero-day") exploits. Appropriate selection of the predetermined profile or profiles, for instance where the profiles correspond to known and acceptable sources of signalling, may assist here. Multiple profiles may more usually be used to cover different threats and/or different forms of acceptable signalling behaviour (such as may originate from different types of network entities).

The evaluation is typically statistical in nature, comparing a signalling traffic pattern from the unknown source with the profile. Goodness of fit tests (such as a Chi-Squared test) may be therefore used. The use of statistics may be especially efficient, as it allows a single test to detect an unusual (and therefore potentially undesirable) signalling traffic pattern in a quick way that need not require significant resources such as processing, space and/or power. Moreover, this check need not be performed on receipt of each message (and preferably is performed on the basis of a plurality of signalling messages, which typically will be a significantly large number). Instead, it need only be performed once a sufficient number of messages have been collected to form a profile, for example for a specific network entity (Global Title) under consideration.

Thus, at least one statistical parameter may be established in respect of signalling traffic received at the telecommunications network from at least one specific source. Then, undesirable signalling traffic may be detected on the basis of an evaluation of the established at least one statistical parameter against a predetermined statistical profile.

The profile may define statistical data indicating one or more patterns in the signalling traffic. For example, the profile may comprise a statistic, such a number or frequency, for each of a plurality of signalling message types. Some of the signalling message types may themselves be identified as undesirable in nature, such that their presence in a sufficient quantity may add a further indication of undesirable signalling traffic. This may be incorporated by a weight in a statistical test, for instance.

The predetermined profile may be set (which may be an initial configuration, a one-off update or a repeated or continuously updated technique) by monitoring a known source of signalling traffic. Preferably, the known source of signalling traffic provides only acceptable or desirable signalling traffic. Comparing a signalling traffic profile from an unknown source with the signalling traffic profile based on the monitored known source may yield indications about the actions of the unknown source.

BRIEF DESCRIPTION OF THE DRAWINGS

The invention may be put into practice in a number of ways, and a preferred embodiment will now be described by way of example only and with reference to the accompanying drawings, in which.

DETAILED DESCRIPTION OF A PREFERRED EMBODIMENT

Figure 1:
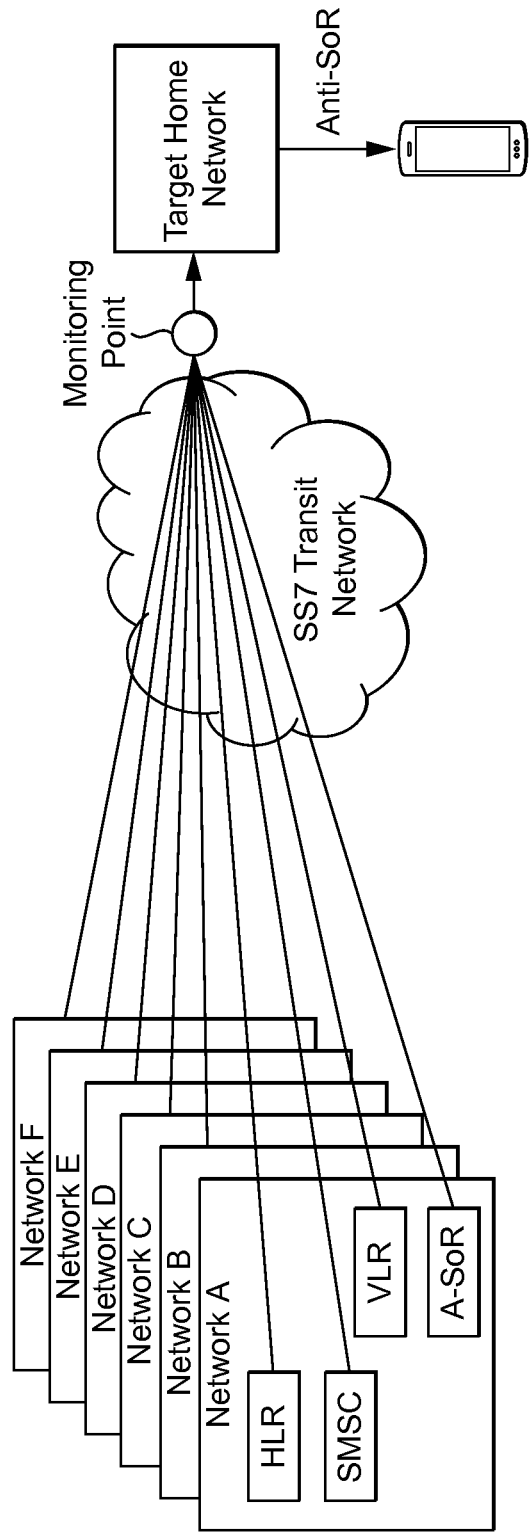
FIG. 1 schematically shows how anti-steering-of-roaming signalling may be hidden within roaming signalling.

Detecting undesirable signalling sources may be termed element profiling. The aim of element profiling is to identify suspicious nodes within the SS7 network so that appropriate action can be taken (for instance, request that the roaming partner stops the abuse, or actively block the malicious traffic). In order to do this a two-phase approach is proposed.

The approach aims to learn Mobile Application Part (MAP) signalling profiles which move across the SS7 transit network. This is achieved by monitoring control information signalled from a known network node, such as a trusted roaming partner's Home Location Register (HLR) and building a profile of the signalling sent from that network node to the home network. By learning the signalling profiles of many known network nodes, it is possible to build a database of profiles which are related to MAP functions. The profile database may then be used as a point of comparison when an unknown network node commences signalling via the SS7 transit network. The comparison can be made by statistical treatment of the newly generated profile such as by performing a goodness-of-fit test (for instance, a Chi-Squared test) relative to those stored in the profile database.

In one generalised aspect, this may be understood as a method of detecting undesirable signalling traffic received at a telecommunications network. The method comprises: establishing at least one statistical parameter in respect of signalling traffic received at the telecommunications network from at least one specific source. Then, the method may further comprise detecting undesirable signalling traffic on the basis of an evaluation of the established at least one statistical parameter against one or more predetermined statistical profiles. Advantageously, at least one, some or each of the one or more predetermined statistical profiles correspond with an acceptable signalling traffic profile, although at least one, some or each of the one or more predetermined statistical profiles may correspond with an unacceptable signalling traffic profile in some embodiments. In any event, at least one, some or each of the one or more predetermined statistical profiles may originate from a known source. The determination of such a profile and its structure will be discussed further below.

A computer program, configured to carry out any method as described herein when operated by a processor is also provided. A network entity configured to operate in accordance with any such method may further be considered. Such a network entity may comprise: a monitoring input, configured to establish at least one statistical parameter in respect of signalling traffic received at the telecommunications network from at least one specific source; and a detection processor, configured to detect undesirable signalling traffic on the basis of an evaluation of the established at least one statistical parameter against one or more predetermined statistical profiles. This network entity may be configured to act as a firewall on signalling traffic between the telecommunications network and external signalling traffic sources.

Stage 1—Learning

Figure 2:
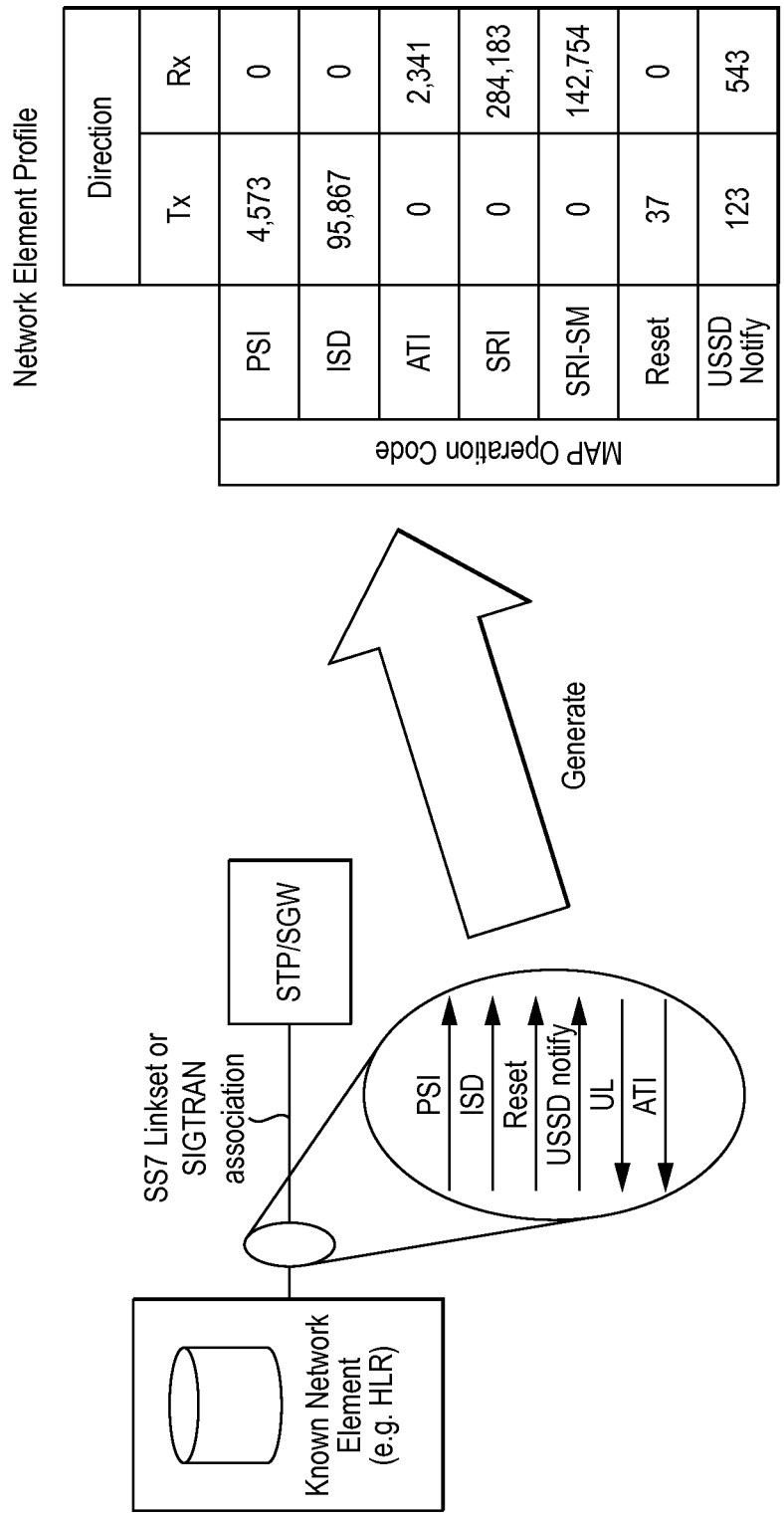
FIG. 2 depicts a schematic example of profile learning, in accordance with an aspect of the present disclosure.

The first stage may be to train the system to recognise the SS7 signalling characteristics of network functions (for instance, MSC or HLR). Referring next to FIG. 2, there is depicted a schematic example of profile learning, in accordance with this aspect. The training is achieved by monitoring the signalling associated with a known set of functions (both well-known standard GSM functions, such as HLR and malicious functions such as Anti-Steering of roaming platforms). The signalling traffic to and from a known network element is monitored, and the total number of each message type sent or received is used to generate the profile for the node type. This will be now be discussed in more depth.

For each element, the messaging sent and received is monitored and used to define a 'known profile' by counting the number of operations of each type sent or received. Each profile recorded would be registered against the SCCP Global Title of the network element, an identity of the element type (such as HLR) and an indication of whether this is an acceptable function or unacceptable function.

Note that the table of FIG. 2 may only be an example. In real implementations, all 60+ MAP operations may be considered, as well as potentially other SS7 application protocols (e.g. the CAMEL Application Protocol; CAP). Also, many more network functions may be profiled as many legitimate functions make non-standard use of some MAP operations.

It should also be noted that the number of these operations will likely vary, for instance based on platform size and potentially equipment vendor, or by network operator. An alternative would be to consider each MAP operation as a proportion of the total traffic received/sent by the node.

According to the generalised aspect, the method may therefore further comprise: monitoring signalling traffic from at least one known signalling source. Then, the one or more predetermined statistical profiles may be set on the basis of the monitored signalling traffic. The monitoring input of the network entity may be configured accordingly. Alternatively, a separate network entity may be used for monitoring and/or setting in respect of the predetermined profile.

The one or more predetermined statistical profiles preferably comprise a number, proportion (with respect to the total number of signalling messages, for example) or frequency of each of a plurality of signalling message types. The one or more predetermined statistical profiles optionally identify one or more of the plurality of signalling message types as an undesirable message type.

Although the generalised system may apply to different types of signalling messages, typically the signalling traffic uses Signalling System Number 7. It may comprise one or more of: Mobile Application Part (MAP) messages; and CAMEL Application Part (CAP) messages.

Stage 2—Monitoring

Figure 3:
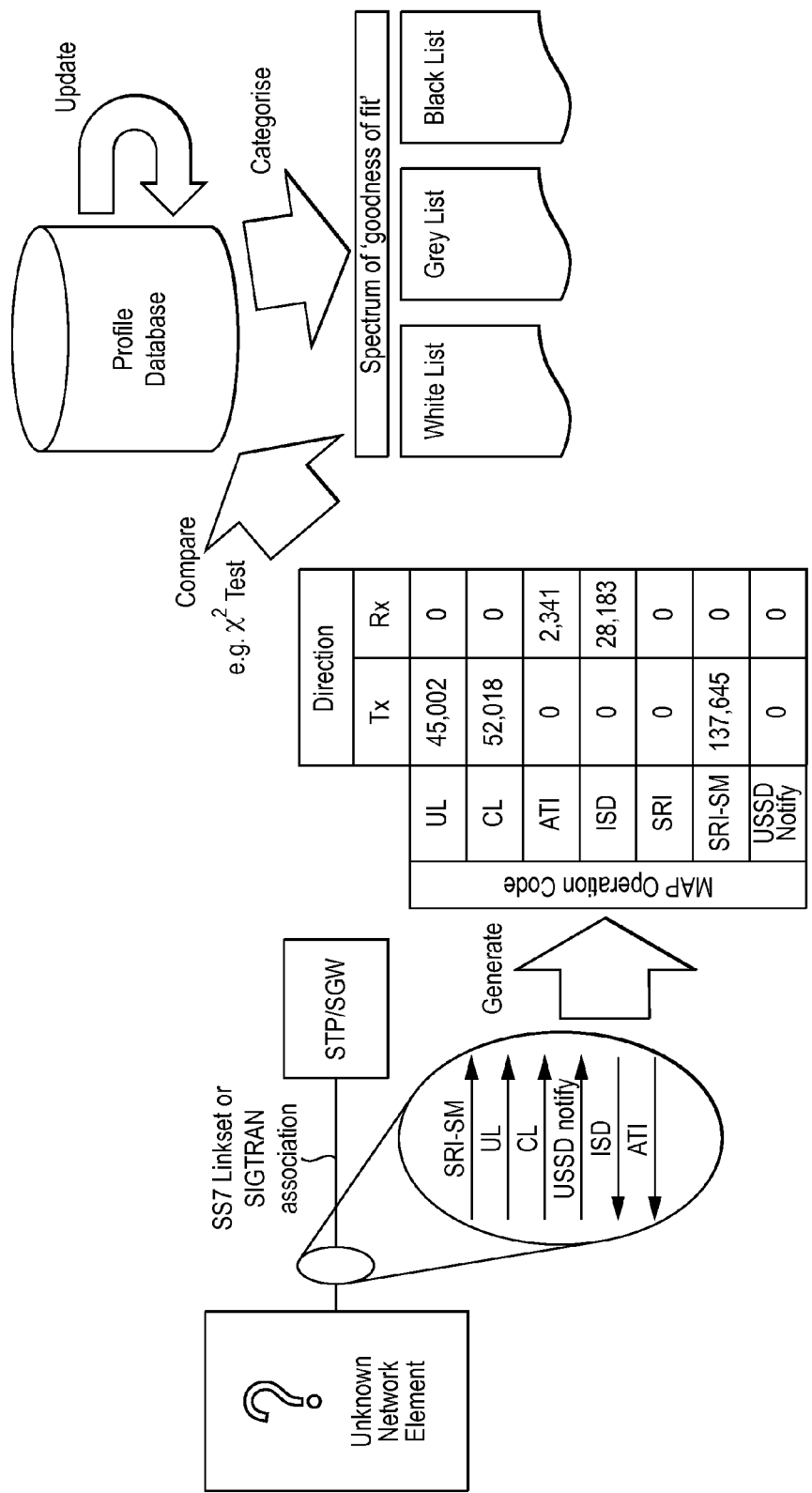
FIG. 3 depicts a schematic example of profile monitoring, in accordance with another aspect of the present disclosure.

Once a suitably large 'known' profile database has been created, the system can be turned into a monitoring mode. In this mode, all inbound and outbound SS7 traffic may be monitored and for each network function (based on SCCP Global Title), a profile may be generated. Referring to FIG. 3, there is shown a schematic example of profile monitoring (and/or management or enforcement). As will be explained below, the signalling traffic to and from the unknown network element is monitored to generate a profile which is then compared to a database of previous profiles and a statistical test (e.g. the Chi-Squared test) used to categorise the goodness of fit. Based on this categorisation, automatic or manual enforcement of a signalling policy can be imposed.

Each of Global title the profile may then be compared to the known profiles within the database. Inevitably, an exact profile match is unlikely and therefore well-known statistical techniques such as the Chi-Squared test for independence may be used to test the unknown function against each known function. Other methods of comparison are considered but the learned profiles are typically compared and evaluated against incoming traffic.

Based on the 'goodness of fit' or P-value, categorisation could be as follows: a perfect match with an acceptable function could be assigned the P-value 1; a partial match with an acceptable function could be assigned a P-value between 0 and 1; a perfect match with an unacceptable function could be assigned the P-value −1; and a partial match with an unacceptable function could be assigned a value between 0 and −1.

Based on this categorisation, a decision can be made:

White list: Mark the function with the node type it matches with. No further action required. Potentially the new function can be used to update the database profile for the node type to account for changes (e.g. due to a software update).

Black list: Mark the function with the node type it matches with. Possible further actions include: Allow traffic but log/alarm activity for manual intervention, or block all further traffic from the GT Grey list: The unknown function is not a good match for any known function. Further traffic from the GT should be allowed, but detailed logs kept with the aim of sufficient information being recorded for manual analysis and potentially a new profile being defined (either for white or black-listing).

Note that the two P-values between +1 and −1 used to separate white, grey and black lists may be for further study, based on live network testing. For new GTs, once a sufficient sample size of messages have been monitored, a profile for the 'unknown' function can be created and this compared to the previously learnt 'known' profiles. Note that multiple 'unknown' profiles may exist at one time, each with one or more GTs associated with it.

A further enhancement of this system is to identify particular signalling scenarios that are immediately indicative of malicious nodes; one instance of the scenario would be sufficient to 'black-list' a network element. This could be implemented by assigning a weighting to signalling operations within the profile database.

In a generalised sense, the step of detecting may comprise: performing a statistical test (for example using the detection processor of the network entity) to compare the established at least one statistical parameter with the one or more predetermined statistical profiles, the undesirable signalling traffic being detected based on a result of the statistical test. Optionally, the step of detecting further comprises comparing the result of the statistical test against one or more predetermined threshold values, the undesirable signalling traffic being detected based on a result of the comparing (for instance using the detection processor of the network entity). Beneficially, the statistical test is a goodness of fit or independence test, such as one of a: Kolmogorov-Smirnov test; Cramér-von Mises criterion; Anderson-Darling test; Shapiro-Wilk test; Chi-squared test; Akaike information criterion; and Hosmer-Lemeshow test. Other types of similar statistical tests may be applied.

In the preferred embodiment, the method further comprises: configuring a signalling traffic filter to act in a particular way on further signalling traffic from the at least one specific source in a particular way, based on the detection of undesirable signalling traffic. For example, the signalling traffic filter may be configured to act in respect further signalling traffic from the at least one specific source, by one or more of: partially blocking the further signalling traffic; logging the further signalling traffic; redirecting the further signalling traffic; raising an alarm or a report for further action to be taken; and fully blocking the further signalling traffic. The signalling traffic filter may be a separate element to the network entity that detects the undesirable signalling traffic pattern (in which case, signalling internal to the network may be used to configure the signalling traffic filter) or the signalling traffic filter could be part of the same network entity.

The at least one statistical parameter may be configured in the same way as the one or more statistical profiles (as described above). For example, the at least one statistical parameter may comprise a number, proportion (with respect to the total number of signalling messages, for example) or frequency of each of a plurality of signalling message types in respect of the at least one specific source.

The solution reported herein effectively enables a type of firewall to sit on the SS7 transit network, by monitoring the control information exchanged between a home network and unknown external network nodes via SS7 transit network. A comparison and confidence test relative to known external network nodes stored in a profile database is performed to determine a categorisation and action to be enforced upon the unknown node.

The present description may therefore provide a system and method of comparing a profile of received traffic against a stored set of profiles and taking action based on the comparison. The action may include logging the traffic, blocking the traffic, redirecting the traffic or raising an alarm or report for further action to be taken. Although a specific example has been described, the skilled person will appreciate that various modifications and alternatives are possible. The stored set of profiles may or may not be generated by monitoring traffic, for example acceptable traffic, and learning appropriate or allowable behaviour. The learning process may or may not be used therefore. In some embodiments, the learning process may continue in parallel with the monitoring process, so that the predetermined profiles may be updated to reflect changes in acceptable (or unacceptable) signalling traffic behaviour. The comparison may include comparing the profiles and defining a set of thresholds based on closeness of fit. Actions may be defined based on the closeness value and the defined thresholds.

All URLs described here refer to webpages which were accessed on 13 Oct. 2014 and the content of those webpages on that date are incorporated herein by reference.

The invention claimed is:

1. A method of detecting undesirable signalling traffic received at a telecommunications network, the method comprising:
   generating a mobile application part (MAP) signalling profile for an unknown network element that is interacting with the telecommunications network, the MAP signalling profile being based at least partially on MAP functions associated with signalling traffic of the unknown network element, the profile including at least one statistical parameter for the unknown network element's signalling traffic; and
   detecting undesirable signalling traffic by evaluating the established at least one statistical parameter against one or more predetermined statistical profiles, wherein each of the one or more predetermined statistical profiles was previously registered against a signalling connection control part (SCCP) Global Title.

2. The method of claim 1, wherein the one or more predetermined statistical profiles each correspond with an acceptable signalling traffic profile.

3. The method of claim 1, wherein the step of detecting comprises:
   performing a statistical test to compare the established at least one statistical parameter with the one or more predetermined statistical profiles, the undesirable signalling traffic being detected based on a result of the statistical test.

4. The method of claim 3, wherein the step of detecting further comprises:
   comparing the result of the statistical test against one or more predetermined threshold values, the undesirable signalling traffic being detected based on a result of the comparing.

5. The method of claim 3, wherein the statistical test is a goodness of fit or independence test, such as one of a: Kolmogorov-Smirnov test; Cramér-von Mises criterion; Anderson-Darling test; Shapiro-Wilk test; Chi-squared test; Akaike information criterion; and Hosmer-Lemeshow test.

6. The method of claim 1, further comprising:
   configuring a signalling traffic filter to act in a particular way on second signalling traffic that is also received from the unknown network element, the signalling traffic filter acting in the particular way based on the detection of the undesirable signalling traffic.

7. The method of claim 6, wherein the particular way in which the signalling traffic filter acts on the second signalling traffic is by one or more of: partially blocking the second signalling traffic; logging the second signalling traffic; redirecting the second signalling traffic; raising an alarm or a report for further action to be taken; or fully blocking the second signalling traffic.

8. The method of claim 1, further comprising:
   monitoring different signalling traffic from at least one known network element; and
   generating a statistical profile for the at least one known network element using the monitored different signalling traffic.

9. The method of claim 1, wherein the one or more predetermined statistical profiles comprise a number, proportion or frequency of each of a plurality of signalling message types.

10. The method of claim 9, wherein the one or more predetermined statistical profiles identify one or more of the plurality of signalling message types as an undesirable message type.

11. The method of claim 9, wherein the at least one statistical parameter comprises a number, proportion, or frequency for each signalling message type of the unknown network element.

12. The method of claim 1, wherein the signalling traffic uses Signalling System Number 7.

13. The method of claim 1, wherein establishing the at least one statistical parameter for the signalling traffic is conducted by at least evaluating an identified pattern of the signalling traffic.

14. A network entity of a telecommunications network, the network entity including a hardware processor that executes computer program instructions to cause the network entity to:
   generate a mobile application part (MAP) signalling profile for an unknown network element that is interacting with the telecommunications network, the MAP signalling profile being based at least partially on MAP functions associated with signalling traffic of the unknown network element, the profile including at least one statistical parameter for the unknown network element's signalling traffic; and
   detect undesirable signalling traffic by evaluating the established at least one statistical parameter against one or more predetermined statistical profiles, wherein each of the one or more predetermined statistical profiles was previously registered against a signalling connection control part (SCCP) Global Title.

15. The network entity of claim 14, wherein execution of the computer program instructions further causes the network entity to act as a firewall on particular signalling traffic between the telecommunications network and external signalling traffic sources.

16. The network entity of claim 14, wherein the signalling traffic uses a camel application part message type.

17. The network entity of claim 14, wherein the at least one statistical parameter includes an anytime interrogation (ATI) indication.

* * * * *